(No Model.) 2 Sheets—Sheet 1.
T. GRIFFIN.
TRAP.
No. 402,585. Patented May 7, 1889.
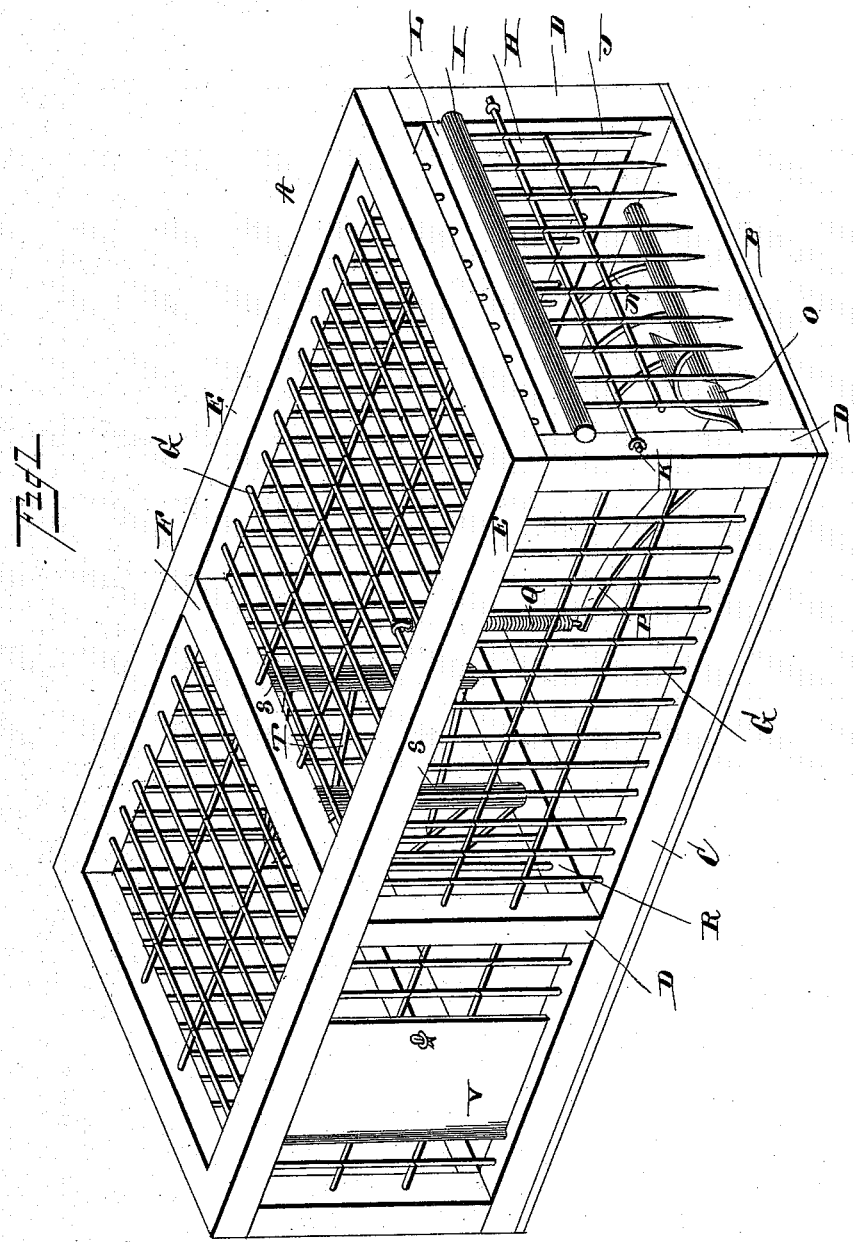
Witnesses.
John Imirie
R. W. Bishop
Inventor,
Theophilus Griffin
By his Attorneys

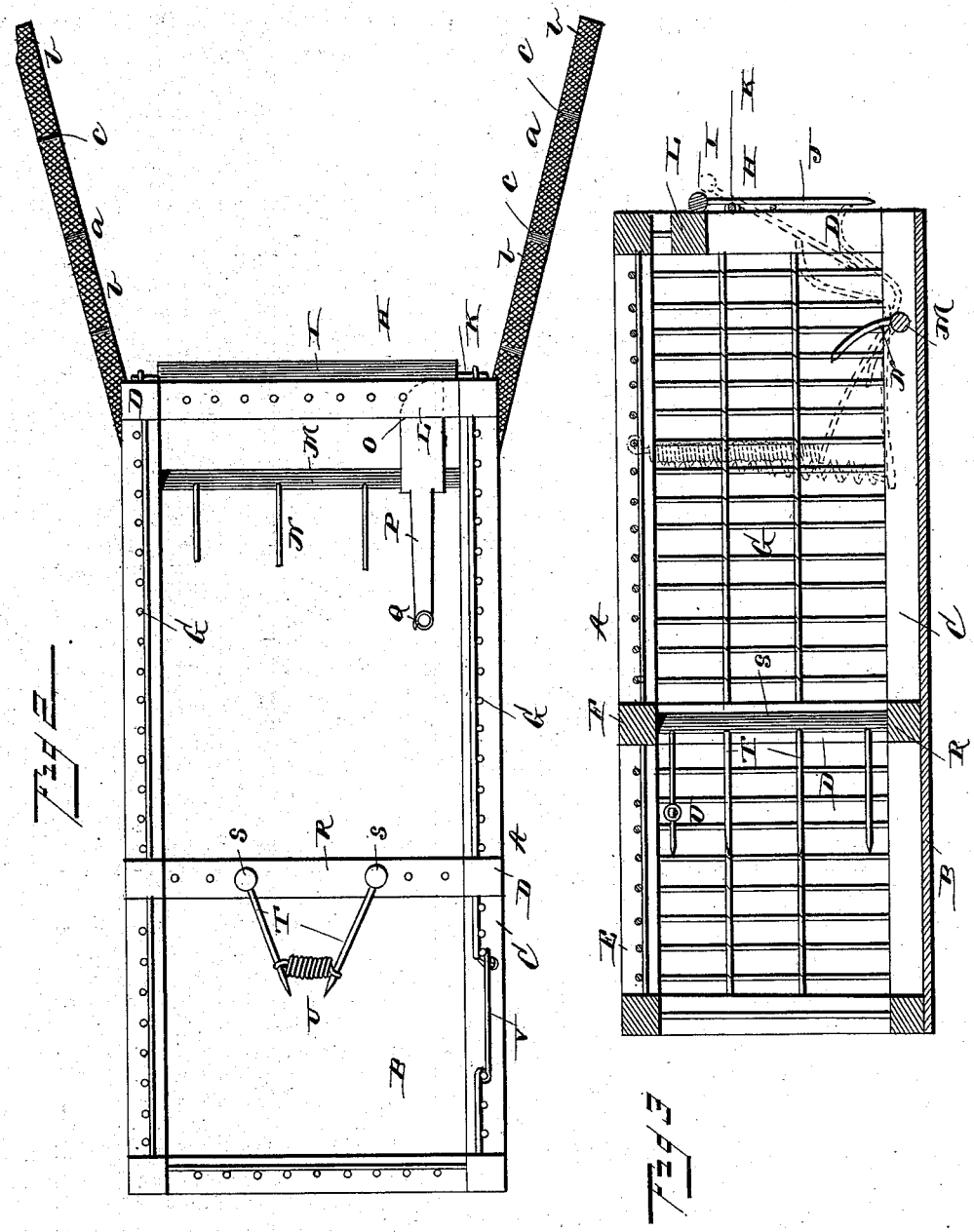

UNITED STATES PATENT OFFICE.

THEOPHILUS GRIFFIN, OF SHERIDAN, ARKANSAS, ASSIGNOR OF TWO-THIRDS TO J. M. NALL AND W. W. WILKESON, OF SAME PLACE.

TRAP.

SPECIFICATION forming part of Letters Patent No. 402,585, dated May 7, 1889.

Application filed January 30, 1889. Serial No. 298,098. (No model.)

*To all whom it may concern:*

Be it known that I, THEOPHILUS GRIFFIN, a citizen of the United States, residing at Sheridan, in the county of Grant and State of Arkansas, have invented new and useful Improvements in Traps, of which the following is a specification.

My invention relates to improvements in traps; and it consists in certain novel features hereinafter described and claimed.

In the accompanying drawings, Figure 1 is a perspective view of a trap constructed in accordance with my invention. Fig. 2 is a plan view with the top removed and showing the wings which are attached to the trap when it is set up to catch fish. Fig. 3 is a longitudinal vertical section.

Referring to the drawings by letter, A designates the frame-work, consisting of a solid bottom or base, B, the lower side rails, C, secured thereon, the posts D, rising from the side rails, and the upper side rails, E, secured upon the posts and connected by the cross-bars F. Wires G are secured between the upper and lower side bars and across the top, so as to give the trap the appearance of sticks or brush-wood and deceive the game. The front end of the trap is open, and in the said end I arrange the swinging door H, consisting of a cross-bar, I, and the wires J, secured to and depending from the said cross-bar. The door is hung upon a transverse rod or rock-shaft, K, the ends of which are journaled in suitable bearings on the posts D at the front end of the trap. The door is thus arranged so that it can swing upward and inward to permit an entrance into the trap, but when swung downward will be prevented from swinging outward, so as to permit an escape from the trap, by reason of the cross-bar I impinging against a cross-bar, L, secured between the front posts.

Within the trap and adjacent to the door H, I arrange a rock-shaft, M, which is journaled between the lower side bars of the frame, and is provided with the upwardly-extending fingers N, of thin wire, as shown. An upwardly and forwardly projecting cam, O, is secured to this rock-shaft and has its front beveled end bearing against one of the depending wires of the door H, so as to hold the said door normally closed. This cam is also provided with a rearwardly-projecting arm, P, which is held normally raised by a spring, Q, having its opposite ends secured, respectively, to the free end of the arm P and to the top of the trap.

At an intermediate point of the length of the trap I arrange the transverse partition R, consisting of vertical wires and having a central opening. Rearwardly-projecting doors are arranged at the side of this opening and consist of the rotating posts S, journaled in upper and lower cross-bars of the frame, and the rearwardly-projecting fingers or wires T, secured to and extending from the said posts. The doors thus constructed are normally drawn toward each other by a horizontal coiled spring, U, having its ends secured to the wires or fingers of the doors, as shown.

At the rear end of the trap I provide the outwardly-swinging door V, which is closed by means of a pin and staple, as shown, and is intended for the removal of the fish and game caught in the trap.

In practice the trap is set up at the desired place, and it may or may not be baited, as may be desired. The wires composing the greater portion of the trap give it the appearance of a number of sticks, so that the game or birds will not distinguish it from the brush-wood. The game enters the trap at the front end, the door H being raised by reason of the game pushing against the same, as will be readily understood. As the said door is raised, the cam O will be thrown upward, thereby lowering the arm P and extending the spring Q, so that as soon as the game has passed the door H the spring Q will lift the arm P, thereby throwing the cam O downward and closing the door, at the same time rotating the shaft M, so as to raise the fingers N to prevent the escape of the game. The game then passes rearward through the trap and through or between the doors extending from the transverse partition R. The game pushes these doors apart against the tension of the spring U, and when the game has passed beyond the doors the said spring draws them together, so that should the game attempt to pass backward through the doors the ends of the wires or fingers will prick his body and thereby prevent his escape. When it is desired to remove the game from the trap, the door V is opened and the game removed therethrough, as will be readily understood.

My improved trap is adapted for catching fish, birds, and game, as well as vermin, and it may be made of any desired size and capacity. It is cheap and simple in its construction, and its advantages are thought to be obvious.

When it is desired to catch fish, the trap is anchored in the stream and the wings *a* (shown in Fig. 2) are attached to its front end and extended therefrom toward the opposite banks of the stream. These wings are composed of a wire net-work made in sections *b*, connected together by hinges *c*, so that when not in use they can be folded into a small space, as will be readily understood. The construction of the wings permits the water to pass through them, while at the same time the fish are arrested and caused to pass into the trap, where they are caught.

Having thus described my invention, what I claim, and desire to secure by Letters Patent, is—

1. The combination, with the frame having an open front end, of the vertically-swinging door mounted in said open end, the cam arranged within the trap in rear of the door and bearing on the same, and a spring acting on said cam to hold the door normally closed, as set forth.

2. The combination of the frame having an open front end, the inwardly and upwardly swinging door mounted therein, the rock-shaft arranged in rear of the said door, the cam secured on said shaft and bearing on the door and provided with a rearwardly-projecting arm, and the spring extending between said arm and the top of the frame, as set forth.

3. The combination of the frame having an open front end, the door mounted therein and consisting of a cross-bar and a series of depending wires or fingers secured thereto, the rock-shaft mounted in the frame in rear of the said door, the fingers projecting from said shaft, the cam secured on said shaft and bearing against the door and provided with a rearwardly-extending arm, and the spring extending between the said arm and the top of the frame, as set forth.

4. The combination, with the frame having an open front end, of the inwardly and upwardly swinging door mounted in said end, mechanism for holding said door normally closed, the transverse partition within the frame, the rearwardly-extending doors projecting from said partition, and the spring secured to and extending between the said doors, as set forth.

5. The combination of the frame having an open front end, the inwardly and upwardly swinging doors mounted in said end, the transverse partition in the frame, the doors comprising the vertical posts journaled in the top and bottom of the frame, the fingers projecting rearwardly from said posts, and the coiled spring secured to and extending between said fingers, as set forth.

In testimony that I claim the foregoing as my own I have hereto affixed my signature in presence of two witnesses.

THEOPHILUS GRIFFIN.

Witnesses:
R. M. RODGERS,
FRANCIS POSEY.